(12) United States Patent
Jabara et al.

(10) Patent No.: US 9,715,833 B2
(45) Date of Patent: Jul. 25, 2017

(54) SYSTEM AND METHOD FOR WIRELESS COMMUNICATION IN AN EDUCATIONAL SETTING

(75) Inventors: Gary B. Jabara, Irvine, CA (US);
Christos Karmis, Irvine, CA (US);
David Brett Simon, Agoura Hills, CA (US); Lloyd Frederick Linder, Agoura Hills, CA (US)

(73) Assignee: Mobilitie, LLP, Newport Beach, CA (US)

( * ) Notice: Subject to any disclaimer, the term of this patent is extended or adjusted under 35 U.S.C. 154(b) by 252 days.

(21) Appl. No.: 13/452,015

(22) Filed: Apr. 20, 2012

(65) Prior Publication Data

US 2012/0202185 A1 Aug. 9, 2012

Related U.S. Application Data

(63) Continuation-in-part of application No. 13/363,943, filed on Feb. 1, 2012, which is a continuation-in-part
(Continued)

(51) Int. Cl.
*H04L 29/08* (2006.01)
*G09B 5/00* (2006.01)
(Continued)

(52) U.S. Cl.
CPC ............... *G09B 5/00* (2013.01); *G09B 5/06* (2013.01); *H04L 67/12* (2013.01); *H04W 4/008* (2013.01);
(Continued)

(58) Field of Classification Search
CPC ............ H04M 1/7253; H04M 1/6066; H04M 1/72522; H04W 4/008; H04W 12/06;
(Continued)

(56) References Cited

U.S. PATENT DOCUMENTS

| 7,184,750 B2 * | 2/2007 | Tervo | G06F 21/88 |
| | | | 455/410 |
| 7,970,351 B2 | 6/2011 | Jabara | |

(Continued)

*Primary Examiner* — Alejandro Rivero
*Assistant Examiner* — Maryam Soltanzadeh
(74) *Attorney, Agent, or Firm* — Davis Wright Tremaine LLP; Michael J. Donohue

(57) ABSTRACT

A communication network includes an instructor wireless communication device and a plurality of student wireless communication devices, which may be conventional smartphones. The student devices do not communicate with the wireless service provider, but communicate with the instructor device in the classroom via a short-range communication network established between the student devices and the instructor device directly or via an access point. In one embodiment, communication with the cellphone network service provider is cut off by disabling the network transceiver in each student device. The instructor device can exchange question and answer data with the student devices. The system can be configured to provide security in student responses to prevent potential cheating. Student answers may be automatically collected, collated, and graded. The answers are accompanied by an ID that uniquely identifies each student. The system may further provide for automatic classroom attendance and participation by logging nonresponsive student devices.

36 Claims, 8 Drawing Sheets

Related U.S. Application Data of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
| | | |
|---|---|---|
| *G09B 5/06* | (2006.01) | |
| *H04W 4/00* | (2009.01) | |
| *H04W 12/06* | (2009.01) | |
| *H04W 76/00* | (2009.01) | |
| *H04W 76/04* | (2009.01) | |
| *H04W 76/06* | (2009.01) | |
| *H04W 88/06* | (2009.01) | |

(52) U.S. Cl.
CPC .......... *H04W 12/06* (2013.01); *H04W 76/005* (2013.01); *H04W 76/045* (2013.01); *H04W 76/06* (2013.01); *H04W 88/06* (2013.01)

(58) Field of Classification Search
CPC ... H04W 76/045; H04W 76/06; H04W 88/06; H04W 76/005; G09B 5/00; G09B 5/06; H04L 67/12

See application file for complete search history.

(56) References Cited

U.S. PATENT DOCUMENTS

| | | | |
|---|---|---|---|
| 8,041,828 B2 * | 10/2011 | Lee et al. ...................... | 709/231 |
| 8,190,119 B2 | 5/2012 | Jabara | |
| 8,995,923 B2 | 3/2015 | Jabara | |
| 9,077,564 B2 | 7/2015 | Jabara | |
| 2002/0031755 A1 * | 3/2002 | Lo et al. ...................... | 434/351 |
| 2005/0277102 A1 * | 12/2005 | Gillette ................... | G09B 5/00 |
| | | | 434/350 |
| 2007/0232357 A1 * | 10/2007 | Takasu .................... | H04W 4/02 |
| | | | 455/558 |
| 2010/0161490 A1 * | 6/2010 | Alrabady .............. | H04W 12/08 |
| | | | 705/50 |

* cited by examiner

SYSTEM AND METHOD FOR WIRELESS COMMUNICATION IN AN EDUCATIONAL SETTING

BACKGROUND OF THE INVENTION

Field of the Invention

The present invention is directed generally to wireless communication devices and, more particularly, to a system and method that allows direct communication between wireless communication devices in an educational setting.

Description of the Related Art

Numerous teaching aids have been used in the classroom over the years. While chalkboards and overhead projectors are still in use, electronic teaching aids have been introduced in more recent times. One such device allows the teacher to poll the class using an electronic polling device. In an exemplary embodiment, each student must purchase the polling device.

The purchase of a specialized device and the specialized installation process in a classroom make this approach economically unfeasible in many classroom settings. Therefore, it can be appreciated that there is a significant need for an electronic communication device useful in an educational setting. The present disclosure provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

Known systems for electronic classroom polling devices require specialized polling devices purchased by each student and the installation of specialized receiving equipment in each classroom. In one product, the electronic polling device contains an ultra-high frequency (UHF) transmitter and the classroom must be equipped with a UHF receiver. The UHF receiver is coupled to a computer system that can compile the polling responses. The drawback of such an approach is the high cost of installation of the UHF receiver and associated support circuitry, as well as the cost for each student to purchase the electronic polling device.

In a different conventional approach, electronic polling is implemented through the use of "smart" phones that have Internet access. In this embodiment, the student uses his or her own wireless communication device as the electronic polling device. Prior to the start of class, the student must use the Internet access capability of the phone to navigate to a predetermined website associated with the class. A drawback of this approach is that students must have Internet access during the class. In some interior locations, such as a lecture hall, Internet access may be unreliable. In addition, students with Internet access available during the classroom period may be tempted to browse the Internet rather than pay attention in class.

The system described herein extends the normal operational features of conventional wireless communication devices. The conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
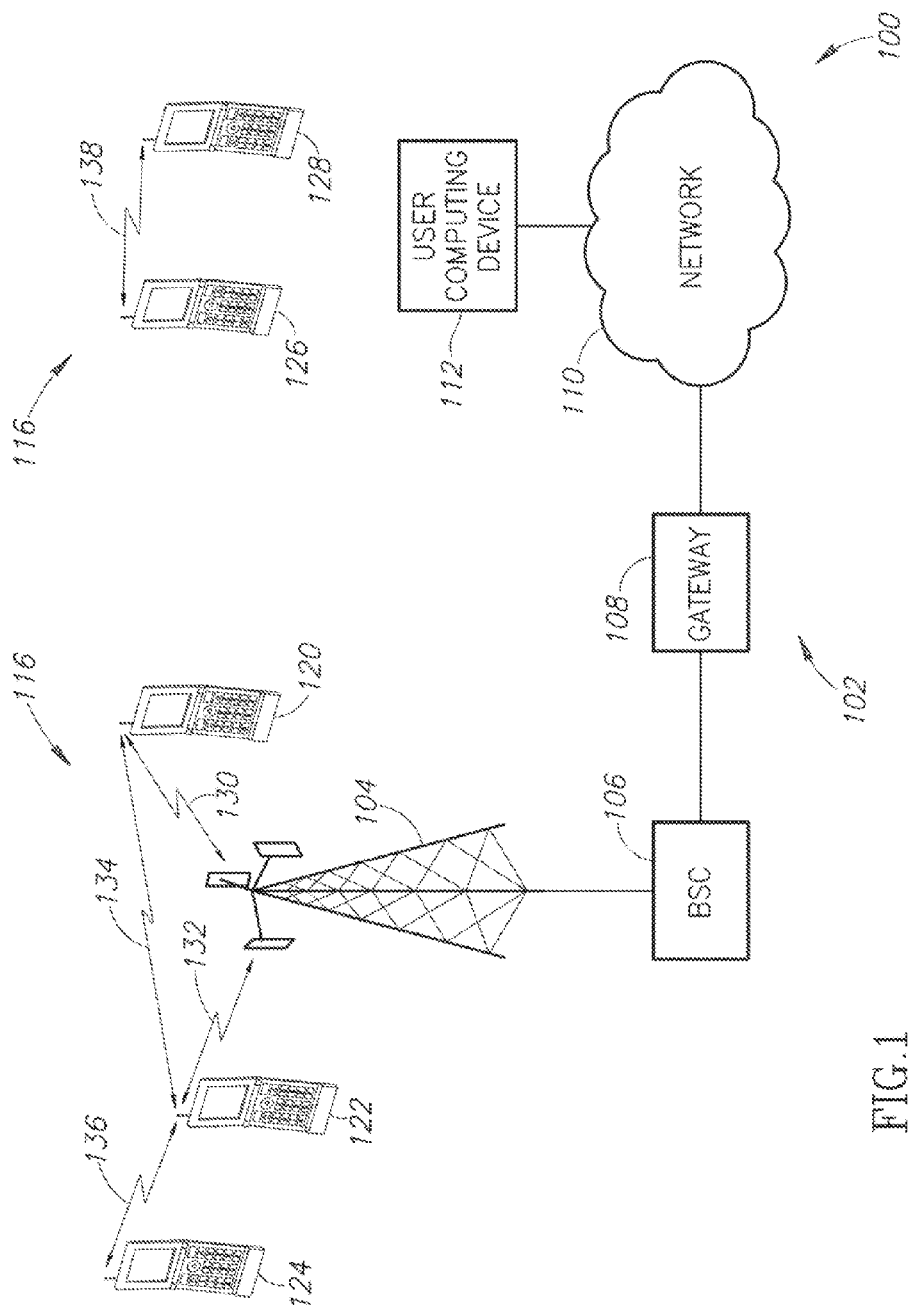
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional wireless communication network 102 includes a base station 104. Those skilled in the art will appreciate that the typical wireless communication network 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104 or other base stations (not shown) in the wireless communication network 102. Those skilled in the art will appreciate that the wireless communication network 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104 or other base station (not shown). Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices. This short-range communication is accomplished without reliance on the wireless communication network 102. Indeed, as will be described in greater detail below, the short-range transceivers in the mobile communication devices 120-128 permit the dynamic formation of short-range communication networks 116 that does not rely on the wireless communication network 102 provided by any wireless service provider. Thus, wireless communication devices can rely on the conventional wireless communication network 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the wireless communication network 102. However, the wireless communication device 124 can communicate directly with the wireless communication device 122 via a short-range wireless communication link 136. Also illustrated in FIG. 1 are the wireless communication devices 126-128. Although neither of these devices is in communication with the wireless communication network 102, the two devices are in direct communication with each other via a short-range wireless communication link 138. Thus, jump-enabled wireless communication devices must be in proximity with each other, but need not be in communication with the wireless communication network 102 or even in an area of wireless coverage provided by the wireless communication network. It is the ability for direct non-network communication that allows the implementation of a system for wireless communication in a classroom setting. This application will be described in greater detail below.

The dynamic formation of one or more short-range networks 116 allows communication between the wireless communications devices 120-128 independent of the wireless communication network 102 even if the wireless communication network 102 is present and operational. The short-range communication network 116 advantageously allows communication in settings where the wireless communication network 102 is not present or in a situation where the wireless communication network is unavailable. In a classroom setting, the wireless communication devices (e.g., the wireless communication devices 120-128) communicate independent of the wireless communication network 102. As described in detail below, in one exemplary embodiment, the network transceivers that allow communication with the wireless communication network 102 are actually disabled during class time. This advantageously prevents undesirable disruption, such as a cell phone ringing in the middle of class, and prevents outgoing calls that may otherwise distract a student from the classroom presentation.

Figure 2:
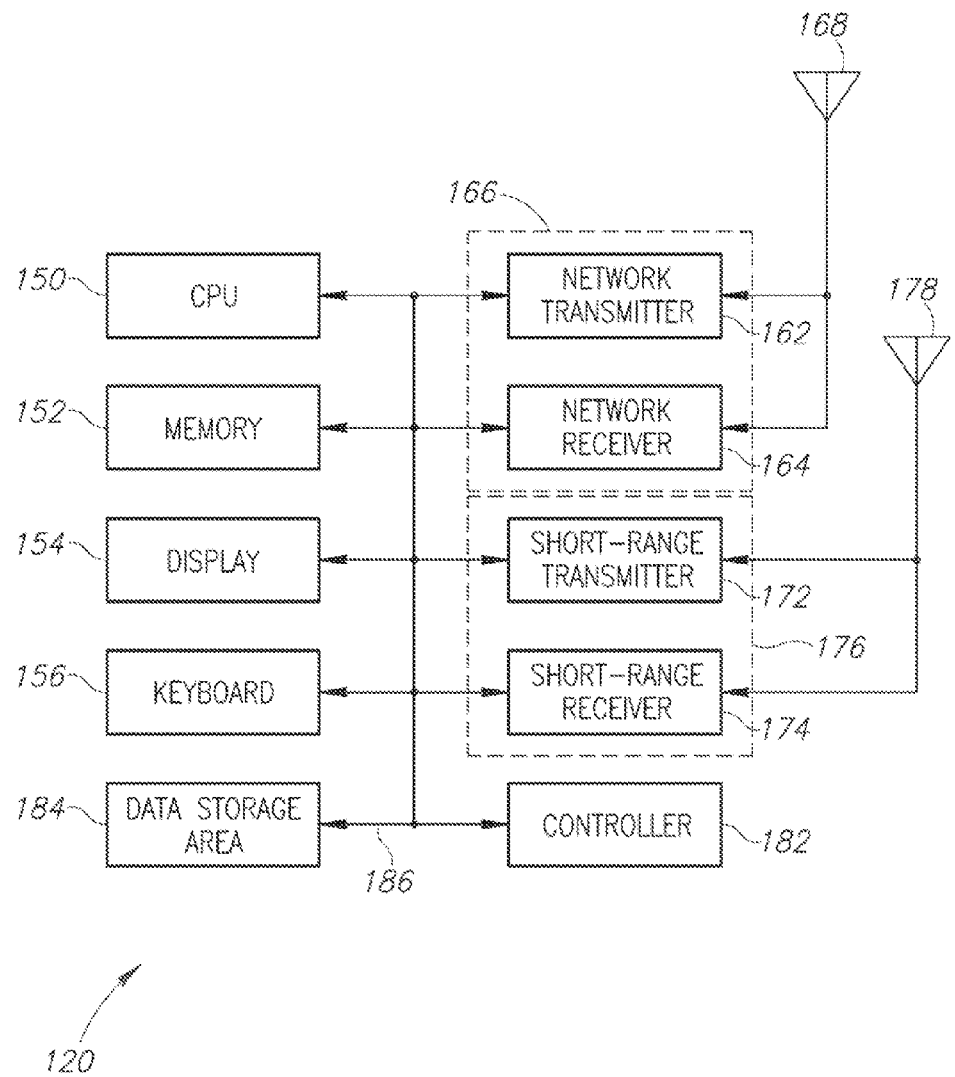
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. In some embodiments, the display 154 is a touch-sensitive display and the functionality of the keyboard 156 is integrated therewith. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the wireless communication network 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between wireless communication devices that become part of the short-range communication network 116. Those skilled in the art will appreciate that the controller 182 may be implemented as a set of instructions stored in the memory 152 and executed by the CPU 150.

The data storage 184 contains user profile data and messaging data that will be exchanged between wireless communication devices in the short-range communication network 116. The data storage area 184 may be implemented as any convenient data structure. In one embodiment, the data storage area 184 may be part of the memory 152.

As will be described in greater detail below, the data storage area 184 contains data (e.g., messages, personal profile information, a geographical location tag for messages, and the like) that will be exchanged between wireless communication devices. The data may be stored as a simple list, part of a database, or any other convenient data storage structure. The user profile can include a broad array of information such as user name, student identification (ID), current course registrations, and the like. In addition, the data storage area 184 may receive messages from other wireless communication devices or from the wireless communication device controlled by the instructor. The messages received may be in the form of questions to be answered by the student or simply a list of possible responses from which the student may select the appropriate answer.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134). In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-128 in FIG. 1 all include WiFi capability, short-range communication networks 116 may be formed even though the wireless communication devices may be designed to operate with incompatible wireless communication networks 102. For example, the wireless communication device 122 may be configured for operation with a GSM implementation of the wireless communication network 102. The wireless communication device 124 may be configured for operation with a CDMA implementation of a wireless communication network 102. Even though the wireless communication devices 122-124 are incompatible with respect to the respective wireless communication networks 102, the wireless communication devices 122-124 may still communicate directly with each other via the short-range communication network 116. Thus, the wireless communication devices 120-128 may operate compatibly to form the short-range communication networks 116 even though the network transceivers 166 (see FIG. 2) may operate with different incompatible wireless communication networks 102.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,988 filed on Apr. 26, 2011, the entire disclosures and content of which are hereby incorporated by reference in their entirety.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. As will be described in greater detail below, the instructor in the classroom setting has a wireless communication device that will act as a local hot spot. Alternatively, the classroom may be equipped with one or more access points 140 (see FIG. 3), which will act as hot spots to initiate the formation of the short-range communication network 116. In yet another alternative embodiment, described below, the wireless communication devices may be pre-programmed to utilize a common SSID, IPrange, and port to spontaneously form a short-range communication network 116 even in the absence of any hot spot.

In an exemplary embodiment, each classroom could have a unique SSID. When a student signs up for the class, they can be given a list of SSIDs of the access points 140 in the classrooms that have been assigned for the students classes. Alternatively, the student may be provided with a password for each SSID.

In yet another alternative embodiment, the access points 140 in a given classroom are capable of transmitting multiple SSIDs. Depending on the manufacturer, an access point may have between 8 and 64 unique SSIDs. With this capability, each teacher could have a unique SSID for the same access points 140 in the same classroom. Indeed, a teacher could have different SSIDs for the same access points 140 in the same classroom, but for different sessions of the same class or for different classes within the same classroom. That is, a professor may teach two different sections of the same class in the same classroom. To distinguish between students in Section 1 and Section 2 of the class, the professor may use unique SSIDs for each section. Furthermore, multiple teachers in the same classroom can also have unique SSIDs for the same access points 140.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, since there is no access point in the embodiment of FIG. 1, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
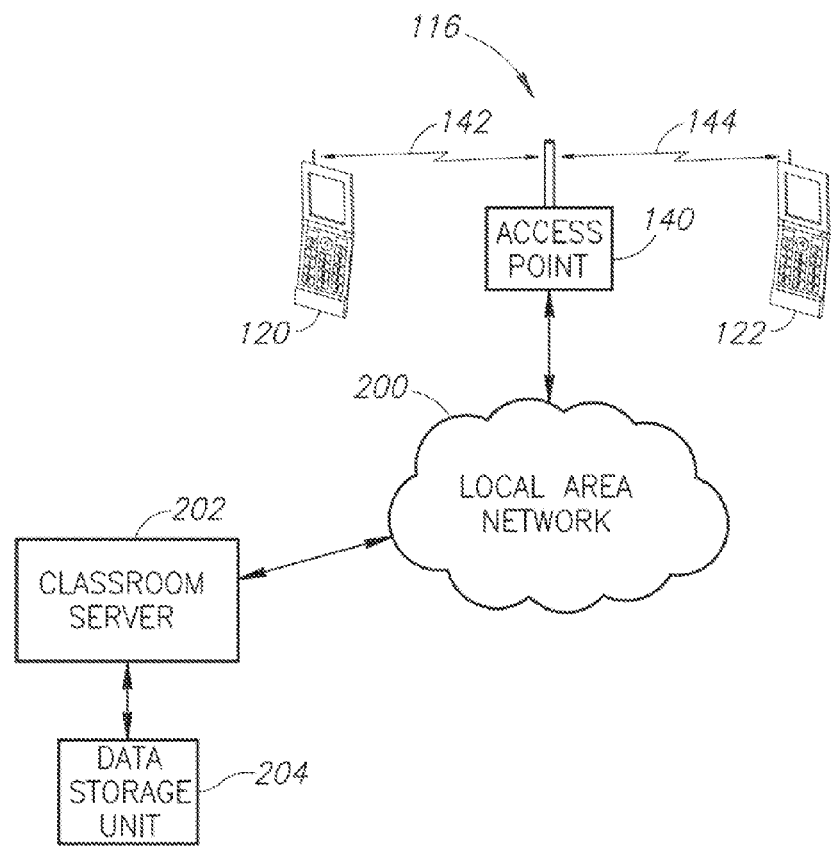
FIG. 3 illustrates an embodiment of the system of FIG. 1 using an access point as part of a network.

In yet another alternative embodiment, illustrated in FIG. 3, the jump-enabled wireless communication devices (e.g., the wireless communication devices 120-122) may communicate with an access point 140, such as a WiFi base station, wireless access point (WAP), wireless router, or the like. FIG. 3 illustrates a wireless communication link 142 established between the access point 140 and the wireless communication device 120. Similarly, the wireless communication device 122 establishes a wireless communication link 144 with the access point 140. Thus, the short-range communication network 116 is formed in conjunction with the access point 140.

The access point 140 is coupled to a local area network (LAN) 200 in a conventional manner. This can include a wired or wireless connection directly to the LAN 200. The access point 140 may also be coupled to a wide-area network (WAN), such as the network 110 in FIG. 1. FIG. 3 also illustrates a classroom server 202, which is coupled to the LAN 200. The classroom server 202 is a conventional computing device whose physical components (e.g., CPU, memory, interfaces, and the like) need not be described in detail herein. The classroom server 202 is coupled to a data storage unit 204, which may be configured to store question/answer data, attendance data, and the like, as described above. In addition, the data storage unit 204 may store student registration information, such as a list of classes in which the student is presently enrolled, student profile information, and the like. Furthermore, the data storage unit 204 may store information for the student's wireless communication device in association with student identification (ID) information. As noted above, and described in greater detail below, the system 100 may be used to collect attendance information, response information, and the like. When the student associated with the wireless communication device 120 generates an answer to a question, the response includes some form of unique identification for the wireless communication device 120. Because the data storage unit 204 has the student's class registration information and the student's mobile device information, it can associate that unique wireless communication device identification information with a student ID to thereby uniquely associate an answer with a particular student. Attendance and other data may be collected in a similar manner.

As will be described in greater detail below, the classroom server 202 can also generate information related to the classroom presentation and store a list of possible questions to be transmitted to the wireless communication devices of the students. Furthermore, the classroom server 202 can collect answers from the students, determine the correct answers, provide grades and other statistical information, monitor student attendance and responsiveness to questions, and the like. Operational details of the classroom server 202 are provided below.

Figure 4:
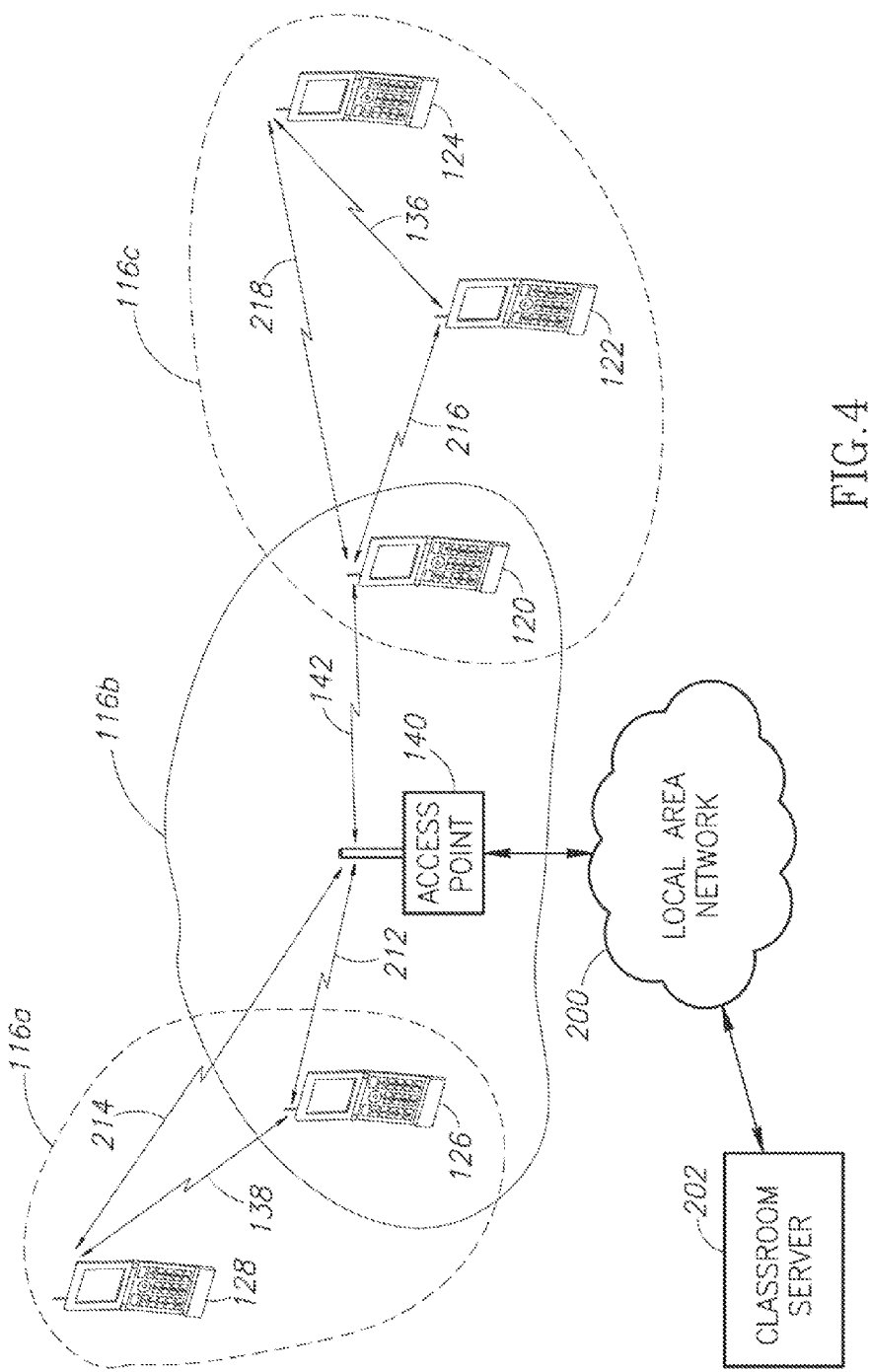
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the wireless communication devices 120-124 and a second short-range communication network 116 formed between the wireless communication devices 126-28. FIG. 4 further illustrates the dynamic nature of the wireless communication networks 116. For example, if the wireless communication device 128 is initially within range of the wireless communication device 126, but out of range of the access point 140, the wireless communication devices 126-128 may form a short-range communication network 116a using the short-range communication link 138. Up to this point, the short-range communication networks have been generically labeled with the reference number 116. To assist in a better understanding of the present disclosure, short-range communication networks will be generally referred to by the reference 116. Specific examples of short-range communication networks will be referred to by the reference 116 and an alphabetic identifier (e.g., the short-range communication networks 116a-116c in FIG. 4).

If the wireless communication device 126 comes within range of the access point 140, a wireless communication link 212 is formed. In that event, the wireless communication device 126 may become part of a short-range communication network 116b formed between the access point 140 and the wireless communication devices 120 and 126. At this particular moment in time, the wireless communication device 126 may be part of both the short-range communication network 116a and the short-range communication network 116b. The wireless communication device 126 may actually be part of both the short-range communication networks 116a-116b or may logically be connected to both the short-range wireless communication networks by switching back and forth between the short-range communication networks 116a-116b. The logical switching between the short-range communication networks 116a-116b is transparent to the user.

Alternatively, the wireless communication device 128 may become part of the short-range communication network 116b using the wireless communication device 126 as a relay to the access point 140. If, at a later time, the wireless communication device 128 comes within range of the access point 140, a wireless communication link 214 is formed there between. At that point in time, the short-range communication network 116a effectively ceases to exist since the wireless communication devices 126-128 are now part of the short-range communication network 116b.

The wireless communication device 120 may be part of the short-range communication network 116b by virtue of the short-range communication link 142 coupling the wireless communication device 120 to the access point 140. If the wireless communication device 120 comes within range of the wireless communication devices 122-124, wireless communication links 216-218 will be formed to couple the wireless communication devices 120-124 and thereby dynamically form a short-range communication network 116c. At this point in time, the wireless communication device 120 may simultaneously be part of the short-range communication network 116b and the short-range communication network 116c. Alternatively, the wireless communication devices 122-124 may become part of the short-range communication network 116b via the wireless communication device 120.

FIG. 4 illustrates a sparse network with only five wireless communication devices. However, those skilled in the art can appreciate that there may be a very large number of wireless communication devices in proximity with each other in a classroom setting. Thus, the short-range communication networks 116 may be large and extensive. There may be a large number of wireless communication devices that are simultaneously present in two or more short-range communication networks 116. In addition, many wireless communication devices would provide overlapping coverage with multiple short-range communication networks 116. In this scenario, the entire classroom could be effectively covered by a mesh network comprising a number of short-range communication networks 116.

Whenever a wireless communication device (e.g., the wireless communication device 124) comes within range of other wireless communication devices, a short-range wireless communication network (e.g., the short-range wireless communication network 116c), the wireless communication devices exchange message data with each other to thereby synchronize message data in the data storage area 184 (see FIG. 2). At the end of the synchronization process, the data storage area 184 of each wireless communication device will contain the same message data, although messages may not be in the same sequence. In the example described above, when the wireless communication device 124 comes within range of the wireless communication device 120 and/or the wireless communication device 122, the wireless communication links 136 and 218 are formed. Because the wireless communication device 124 has just joined the short-range communication network 116e, the data storage area 184 of the wireless communication device 124 will not be synchronized with the data storage area of other wireless communication devices in the short-range communication network 116e. During the synchronization process, the wireless communication device 124 transmits message data in its data storage area 184. The wireless communication devices 120 and 122 receive the message data. The controller 182 (see FIG. 2) in each wireless communication device receives the message data and merges the messages with the message data already stored within the data storage area 184 of the wireless communication devices 120 and 122, respectively. The controller 182 in each of the wireless communication devices may also eliminate duplicate messages. In this manner, each wireless communication device manages the message data within its data storage area 184.

As part of the synchronization process, the wireless communication devices 120 and 122 may also transmit the message data within their respective data storage areas 184. The wireless communication device 124 receives the messages from the wireless communication devices 120 and 122 and merges the newly received messages in the data storage area 184 of the wireless communication device 124. As described above, the controller 182 (see FIG. 2) of the wireless communication device 124 may eliminate duplicate messages within its data storage area 184. Following this synchronization process, all wireless communication devices in the short-range communication network 11e will have identical messages. In a classroom setting, the exchange of data messages can provide students updated information regarding the class (e.g., test dates, study sessions, etc.) as well as provide question/answer data.

In an exemplary embodiment, the messages may be categorized as Public Messages, Group Messages, Direct Messages, and Status Messages. Public Messages may be transmitted to anyone within range of the wireless communication device (e.g., the wireless communication device 120). Group Messages are intended for a specific group or organization, such as students registered in a particular class. Direct Messages are private messages intended for a specific individual, such as a specific student in a class (e.g., see me after class). In addition, the wireless communication device 120 may transmit Status Messages, which can include, by way of example, a list of other students in the particular class, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," FILED ON Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the wireless communication device with which the last synchronization was performed. This information may help maintain synchronization between wireless devices.

The message data may include, but is not limited to, text message data, audio data, video data, multimedia data, or the like. As those skilled in the art will appreciate, Public Messages may be received and processed by any wireless communication device. In contrast, Group Messages may only be processed by a member of the designated group, while a Direct Message may only be processed by the individual wireless communication device for whom the message is intended.

Synchronization may occur directly between the wireless communication devices or via the access point 140 illustrated in FIG. 4. For example, message synchronization can occur between the wireless communication device 120 and the wireless communication device 126 using the access point 140. In addition, as will be described in greater detail below, wireless communication devices can carry message data as they move from one short-range communication network to another.

In another embodiment, the system 100 may broadcast Public Messages to all nearby wireless communication devices. In an exemplary embodiment, Public Messages are intended for broadcast to all students and may include emergency messages. For example, student security is paramount. If there is a reason for a building or classroom to be locked down, an emergency message may be broadcast using the system 100 so that all students receive the message regardless of their registration in a particular class. The dissemination of emergency information can be vital to student security. In addition, other messages may contain weather-related data (e.g., classes ending early due to a snow storm) or the like. Public Messages may also be used for general university announcements. In yet another embodiment, Public Messages may include advertisements for businesses on the campus and related to the school or for off-campus businesses. This may include, by way of example, advertisement messages for a sale at the book store, discounts at the student union, lunch specials at an off-campus restaurant, and the like. Using this form of message distribution, emergency messages, school-related messages, and advertisements will soon be disseminated to all wireless users in the area. The advertisements may take the form of text messages or any other data message format described above. In the classroom setting, Group Messages will typically be used to exchange data between the instructor and students as may now be described in greater detail.

In an exemplary embodiment, each of the wireless communication devices must perform an initial registration process during which an application program interface (API) may be downloaded. Following that initial registration, the system 100 permits the automatic authentication of the wireless communication devices when they come within range of the wireless access points 140. The initial registration can be performed, for example, a single time when the student first arrives at campus. In an exemplary embodiment, the initial registration process can be performed when the student registers for classes the first time. For example, a student could arrive on campus in his freshman year and perform an initial registration process only once during the four year stay in college. The initial registration process may have to be repeated if the student obtains a new phone. In the initial registration process, the student wireless communication device must initially contact one of the wireless access points 140, which may be in a classroom, such as the classroom 220, or in some other venue, such as the school's administration building. In the initial registration process, the student provides data, such as the telephone ID (i.e., the phone number), a device ID, a user ID, and an email address. The user ID may be a user-generated name, nickname, or the like. The device ID may vary based on the particular type of the student's wireless communication device. For example, if the student uses an Android™ operating system, the device will be assigned an Android™ ID. In addition, the student wireless communication device may typically be assigned an international mobile equipment identification (IMEI). Any of these device identifications alone may be transmitted to the classroom server 202 (see FIG. 3) via a wireless access point 140. In this aspect, the classroom server 202 may function as an authentication server. Alternatively, a different computing device coupled to the LAN 200 may perform the authentication process. In another alternative embodiment, a unique hash of one or more of the device IDs may be generated and transmitted to the classroom server 202 as part of the initial registration process. The short-range transceiver 176 (see FIG. 2) may also include an identification, such as a MAC address that is unique to the wireless communication device. The registration data described above can be provided to the classroom server 202 along with the MAC address. The registration data may be stored in association with the MAC address.

The student information provided in the initial registration can be verified by the classroom server 202 in a number of ways. In one example, the classroom server 202 may send a message to the wireless communication device of the student that must be confirmed by the student within a certain time period. In another alternative, the classroom server 202 may send a conventional email to the student's school email account. The student must respond to the email by establishing a communication link with an access point 140 and transmitting a passcode included in the email. This will confirm student identification information, email information, and the like. In this manner, the student wireless communication device may be registered and authenticated. Once the initial registration process has been completed, subsequent authentications are greatly simplified. This completes the initial registration process. Thereafter, the downloaded API will detect the presence of the access points 140 in a classroom or other locations throughout the campus and automatically perform an authentication process.

Figure 5:
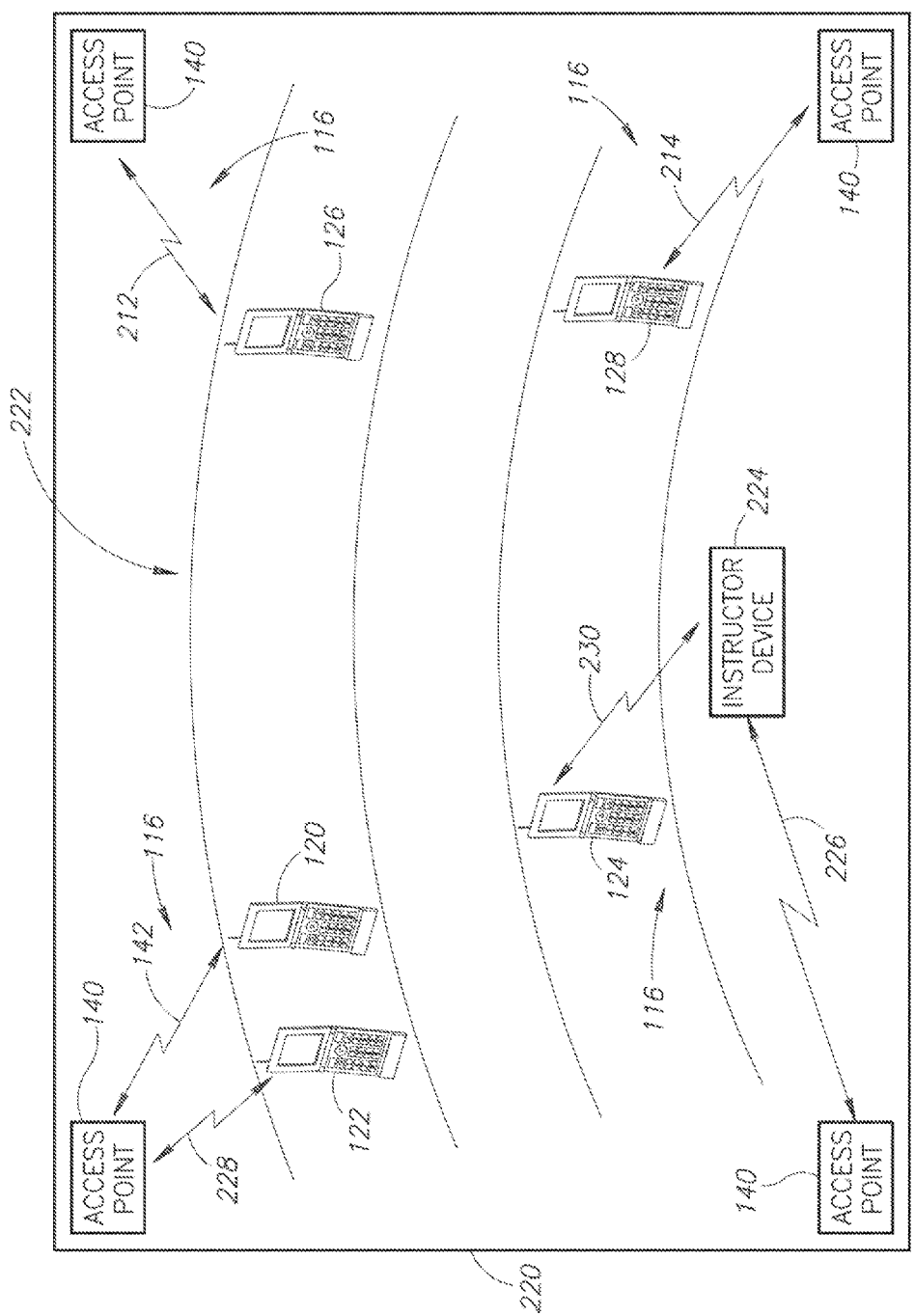
FIG. 5 illustrates the exchange of classroom information using an access point.

FIG. 5 illustrates a classroom venue 220, which is portrayed as a large lecture hall. As illustrated in FIG. 5, a plurality of access points 140 are distributed throughout the classroom 220 to assure complete wireless coverage. The use of multiple access points 140 in a large lecture hall minimizes the possibility that a student wireless communication device (e.g., the wireless communication device 122 in FIG. 4) will not have a direct communication link with the access point 140. Those skilled in the art will appreciate that greater or fewer number of access points 140 may be employed depending on the size of the classroom 220 and the number of students. A single access point 140 may typically provide complete coverage for a small classroom.

In FIG. 5, a large number of seats 222 are distributed throughout the classroom 220. At the front of the classroom, an instructor wireless communication device 224 can communicate with one or more of the access points 140 via a wireless communication link 226. The instructor wireless communication device 224 may, in one embodiment, be operationally identical to the student wireless communication devices 120-128. That is, the instructor wireless communication device may be a conventional wireless communication device (e.g., a smartphone) that includes the network transceiver 166 (see FIG. 2). However, network communication capability is not required for the instructor wireless communication device 224 (or any student wireless communication device). The instructor wireless communication device 224 does include the short-range transceiver 176 in FIG. 2 to permit communication with the student wireless communication devices and/or the access point 140. As such, the instructor wireless communication device 124 may be implemented by a conventional smartphone, computer (e.g., desktop, laptop, and the like), computing tablet, or other portable computing device having the short-range transceiver 176. In an alternative embodiment, the instructor wireless communication device 224 may be physically coupled to a wireless access point 140, the LAN 200 or both using, by way of example, an Ethernet Connection.

As noted above, the API is downloaded to the student wireless communication device as part of the initial registration process. The API functions to automatically detect one or more SSIDs and to establish a communication link therewith. For example, when the student carrying the wireless communication device 120 enters the classroom 220, the downloaded API automatically detects the access point 140 and automatically performs an authentication process therewith. In the automatic authentication process, the wireless communication device 120 will transmit, by way of example, the device ID or user ID. Because the wireless communication device 120 has already undergone the initial registration process, the classroom server 202 contains information identifying the wireless communication device 120 thereby authenticating that device (i.e., the wireless communication device 120) within the classroom 220.

Returning to FIG. 5, as each student enters the classroom 220, the API in their wireless communication device causes the device to detect and establish a wireless communication link with a wireless access point 140. As illustrated in FIG. 5, the wireless communication device 120 communicates with an access point 140 via the wireless communication link 142. Similarly, the wireless communication device 122 communicates with the same access point 140 via a wireless communication link 228. Wireless communication devices 126-128 communicate with different access points via the wireless communication links 212-214, respectively. Although the student wireless communication devices (e.g., the wireless communication devices 120-128) would typically communicate with one of the wireless access points 140 in the classroom 220, FIG. 5 illustrates the wireless communication device 124 communicating directly with the instructor device 224 via a wireless communication link 230. This is intended to illustrate the flexibility of the system 100, which has the flexibility to permit device-to-device direct communication, such as via the wireless communication link 230 or device-to-device communication via the wireless access points 140.

In an exemplary embodiment, the system 100 may disable the network transceiver 166 (see FIG. 2) upon authentication of the student wireless communication device inside the classroom 220. For example, the authentication process can activate a "classroom mode" in each student wireless communication device as it is authenticated within the classroom 220. In an alternative embodiment, the activation of the classroom software application program can automatically set each student wireless communication device into a classroom mode when the application is launched. In the classroom mode, the network transceiver 166 is disabled. This has the advantageous effect of eliminating undesirable disruptions within the classroom, such as a cellphone ringing in the middle of a lecture, and also avoids the temptation of students making outgoing calls or accessing the Internet using the network transceiver 166. As the student wireless communication devices exit the classroom, the various short-range wireless communication links with the access points 140 are broken and the classroom mode is disabled thereby reactivating the network transceiver 166. As discussed above, the instructor may also be able to cause a disconnection of the student wireless communication devices by instructing the access points 140 (see FIG. 5) in the classroom 220 to temporarily suspend transmission. This effectively terminates all of the short-range wireless communication links between the access points 140 and the various student wireless communication devices thereby causing the student wireless communication devices to disconnect from the system. The disconnection of each student wireless communication device will disable the classroom mode thereby reactivating the network transceiver 166.

Figure 6B:
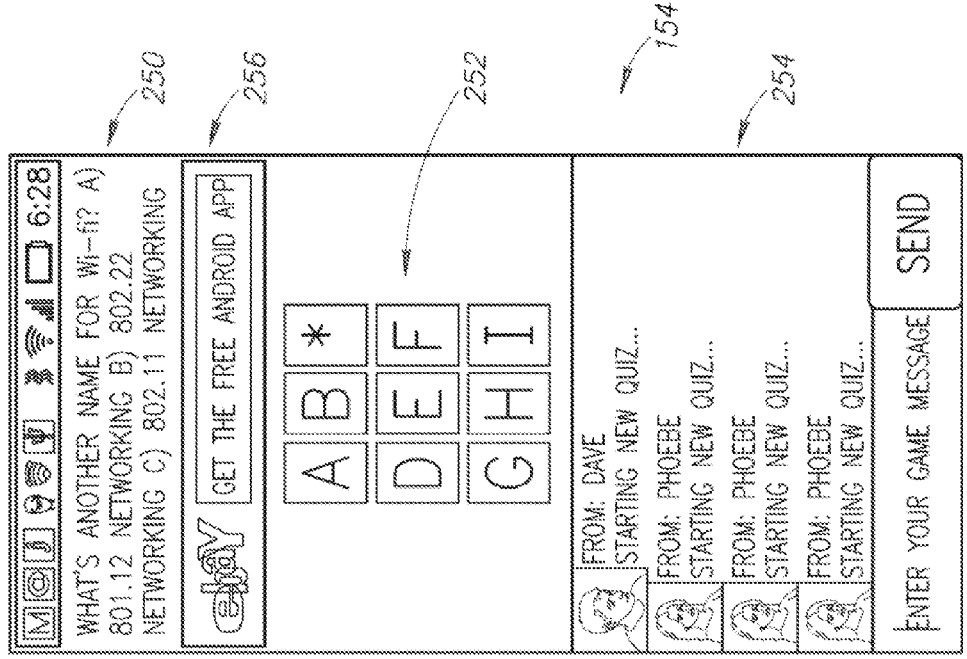
FIG. 6B illustrates the display of FIG. 6A with a selected answer.
Figure 6A:
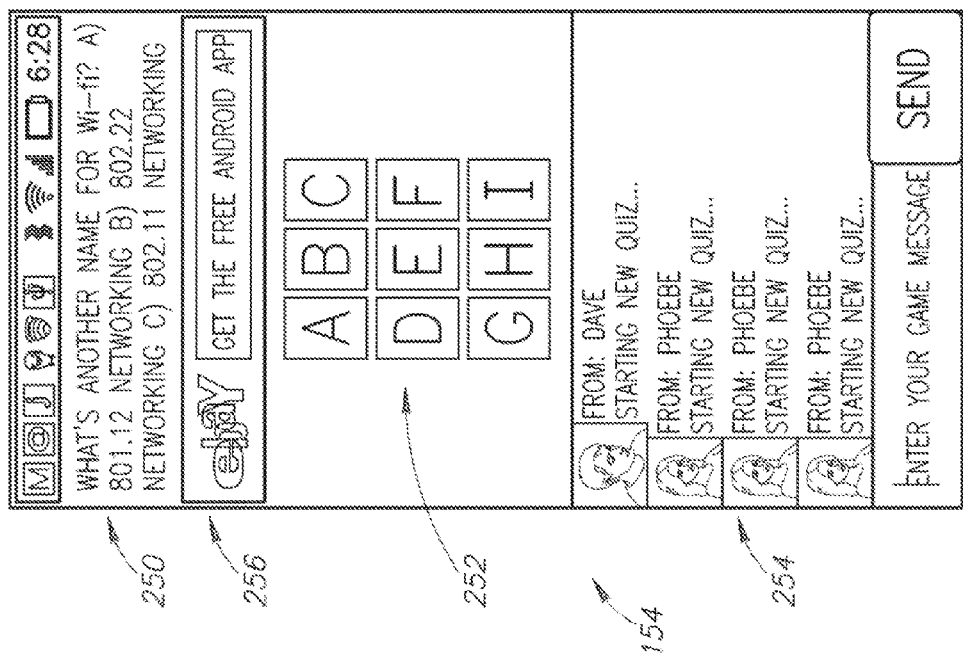
FIG. 6A illustrates a display with a question and possible answers.

While in the classroom, the student wireless communication device can perform a number of functions controlled by one or more application software programs that may operate in conjunction with the API. In an exemplary embodiment, application programs can be downloaded to the student wireless communication devices at the time of the initial registration. For example, with a classroom software application program the student wireless communication device can operate as electronic polling using the short-range transceiver 176 (see FIG. 2) to communicate with the wireless access point 140. In one embodiment, the instructor may use the instructor device 224 to post a question to be answered by each of the students using their respective wireless communication devices. The wireless communication devices 120-128 (see FIG. 1) generally have sufficient memory capacity to temporarily store question/answer information. For example, the instructor may display a question with multiple choice answers (such as A-E or 1-4). In one embodiment, the student may simply respond to the question by typing the appropriate selection as a message and transmitting it, using the messaging process described above, to the instructor device 224 via the wireless access point 140. Those skilled in the art will appreciate that many variations can be readily implemented with the system 100. For example, the instructor device 224 may transmit the question and provide spaces on the touch screen display 154 (see FIG. 2) of each student wireless communication device using a Group Message. Because each student registered in the class is part of that class group, they may be designated as a group for purposes of transmitting and receiving group messages. The student may simply press the portion of the screen with the selected answer, which may be automatically transmitted back to the instructor device 224. The message transmitted from each student wireless communication device also includes some form of identification, such as the user ID or device ID, as described above. The classroom server 202 can thereby associate and answer with each particular student. Furthermore, the classroom server 202 can determine if a student is present in the classroom, but does not respond to the question. FIGS. 6A and 6B illustrate an example of the display 154 of a student wireless communication device (e.g., the wireless communication device 120 of FIG. 2). In the example of FIG. 6A, a question is transmitted from the instructor device 224 to each of the student wireless communication devices via the access point 140 using a Group Message and shown on the display 154 as a question 250. The display 154 also provides space on the touch-sensitive display 154 for answer buttons 252. The student selects an answer by tapping on the appropriate answer button, such as illustrated in FIG. 6B where the student has depressed the "C" answer button 252. The selected answer is transmitted back to the instructor device 224 in a Group Message or in a Direct Message. The Group Message may be used in situations where it is desirable to share the immediate results with the students. However, if the questions are being presented as part of a quiz, for example, the system 100 advantageously provides for Direct Messages that are only processed by the intended recipient, which is the instructor device 224 in the present case. Thus, security may be maintained that prevents students from intercepting answers provided by other students. In an exemplary embodiment, Direct Messages may also be encrypted for greater security.

FIGS. 6A and 6B also illustrate text messages 254 that may be exchanged between the student wireless communication devices and/or the instructor device 224. Text messages may be exchanged between students as a form of social networking. However, the promotion of communication among fellow students may also enhance productivity in the classroom. For example, it is possible to have a "study buddy" feature. In addition to the answer buttons 252 (see FIGS. 6A-6B), the display could have a study buddy button to automatically request study sessions from other students registered in the class. In this embodiment, a group message may be automatically transmitted to other students registered in the class to request assistance in forming a study group. Those skilled in the art will appreciate that the system 100 can exercise a great deal of control over the type of messages that are transmitted. For example, while class is in session, it is possible to block all Public Message and Group Messages and only allow Direct Messages between the instructor and individual ones of the students in the classroom 220. Alternatively, it is possible to merely block Public Messages while allowing Group Messages to be exchanged between classmates and between students and the instructor. These various features may be enabled or blocked to accommodate classroom rules. In addition, the system 100 can be configured to enable or disable texting via the short-range communication network 116 in the classroom 220. Texting may be more of an issue for elementary school or high school as opposed to college. The display in FIGS. 6A and 6B also illustrates ad messages 256, which are described above.

Figure 7:
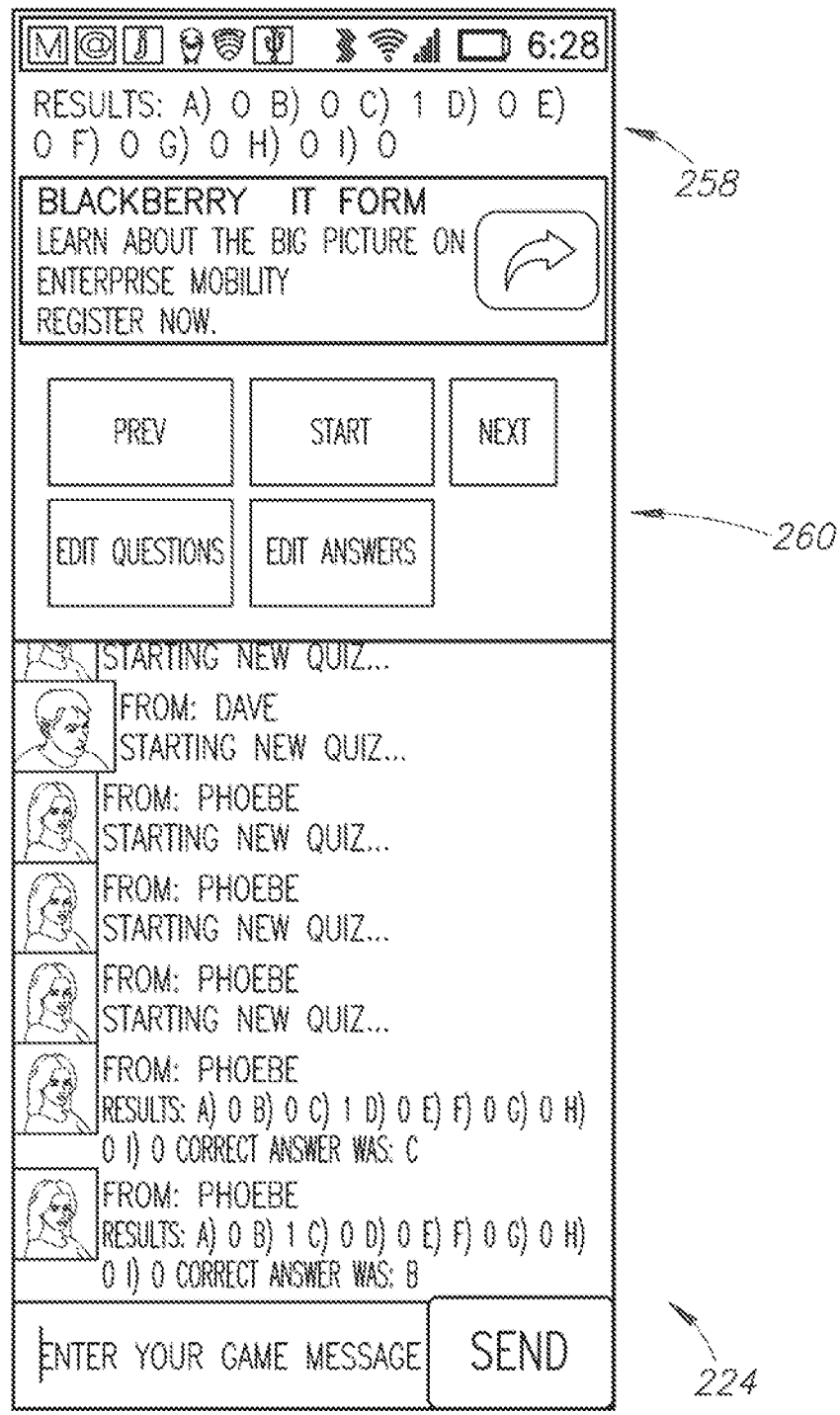
FIG. 7 illustrates a display of an instructor device receiving selected answers from student devices.

FIG. 7 illustrates a display on the instructor device 224 that displays the results 258 to the question 250 (see FIGS. 6A-6B). In one embodiment, the results 258 may be displayed as a running total as each answer is received from the student wireless communication devices. Alternatively, there may be a fixed time period in which to answer questions. The results 258 may be displayed at the end of the time period.

Those skilled in the art will appreciate that a number of variations are within the expertise of one of ordinary skill in the art. For example, it could be appreciated that the answers to the question 250 may be in multiple different sequences and sent to the various student wireless communication devices. For example, the correct answer for some of the student wireless devices could be "A" while on a different set of student wireless communication devices, the correct answer to the same question could be "B." Because the answer sequence may be different from one student wireless communication device to another, looking at your neighbor's answer may not be helpful.

As answers are received, the classroom server 202 can compile the data, determine which students had correct or incorrect answers, and perform other statistical measures, such as class average, high score, low score, etc.

In an example embodiment, the instructor device 224 may be programmed for a plurality of questions, such as may be used in a quiz or exam. FIG. 7 illustrates a plurality of control buttons 260 operable by the instructor to control presentation of a test. For example, a Start button begins the test while a Next button advances to the next question and a previous button goes back to the previous question. FIG. 7 also illustrates a button to edit questions and a button to edit answers. These may be used by the instructor in the construction of the test. The test questions and the answers may be created, edited, and stored using the instructor device 224. Alternatively, the instructor may prepare a test using a conventional computer coupled to the LAN 200. The test questions and answers may be uploaded to the classroom server 202 and downloaded to the instructor device 224 at the start of the class period. In addition, the test may be constructed with automatic timing sequences such that each question is displayed on the student wireless communication devices for a particular period of time before the next sequential question is transmitted to the student wireless communication devices. This avoids the need for manual operation of the control buttons 260 in FIG. 7 to move to the next question.

As previously discussed, the answers are received from the various student wireless communication devices in the classroom 220 and delivered to the instructor device 224. In turn, the instructor device 224 may process the answers and display the data on the instructor device 224 or on a large classroom display. Alternatively, the instructor device 224 may provide the answers to the classroom server 202 to perform the grading and a statistical analysis, as described above. In another aspect of the system 100, the classroom server 202 can collect test data from a plurality of different classrooms taking the same test, but in different locations or at different times, and compare the test results across the different classes. The class-to-class comparison may provide a measure of teacher quality and may also serve as an academic challenge between classrooms. Furthermore, the classroom server 202 can compare test data for the same test provided to multiple different educational institutions to compare the relative academic prowess of each academic institution.

As noted above, the student wireless communication devices are automatically authenticated by the system 100 as soon as the student enters the classroom 220. This authentication may be used as an automatic attendance monitor by assuring that the student (or at least the student's wireless communication device) is in the classroom 220. In one configuration, the API, which is downloaded to each student wireless communication device as part of the initial registration process described above, is also configured to generate a "heartbeat" signal that periodically reports location data to the classroom server 202. The heartbeat signal may be transmitted to the access point 140 as part of the authentication process because the heartbeat signal contains all necessary information (e.g., student ID, location data, class registration data, password, etc.) The location data may include a time/date stamp to provide location information for each student wireless communication device. This information can be useful to assure that the student has not simply entered the classroom 220 at the beginning of the classroom to "check in" and then leave the class prior to the end of the lecture. If the student leaves the classroom prematurely, the heartbeat signals will no longer be transmitted to the access points 140 in the classroom 220 and thus, the classroom server 202 may determine that the student was not present for the entire lecture.

In another aspect, the system can determine whether all students present in the classroom 220 are, in fact, registered for the course. As described above, each wireless communication device is authenticated by the classroom server 202 as it enters the classroom 220. The classroom server 202 can also check registration records for each authenticated device to verify that those students are registered in the class. If the student is registered in the class, the system completes the authentication process and communication between the instructor device 224 and the student wireless communication devices 120-128 may occur in the manner described above. If one of the student wireless communication devices being authenticated by the classroom server 202 is not registered in the class, the classroom server may deny the authentication and terminate any communication with the unauthenticated wireless communication device via the access point 140. That is, an unauthenticated student wireless communication device will not receive any Direct Messages or Group Messages, but they still may be able to receive Public Messages via other student wireless communication devices.

When the wireless communication device 120 exits the classroom 220, such as at the end of class, the wireless communication link 142 will be broken. In this event, the wireless communication device 120 is disconnected from the short-range wireless communication system 116 in the classroom 220 and will no longer receive messages via the access point 140. However, the wireless communication device 120 will still receive Public Messages, Group Messages, and Direct Messages by synchronizing message data in the data storage area 184 (see FIG. 2) from other wireless communication devices with which other short-range communication networks 116 may be formed. Alternatively, the instructor may terminate the communication with the various access points 140 at the end of the class period. That is, a command from the instructor device 224 is disseminated to all of the access points 140 in the classroom 220 instructing them to temporarily suspend transmission. This effectively terminates all of the short-range wireless communication links with the student wireless communication devices and causes each of the student wireless communication devices to disconnect from the system. In yet another alternative, the student may disconnect from the system by terminating the classroom software application program described above. In this embodiment, termination of the application program will cause the student wireless communication device to at least temporarily disconnect from the system and terminate the transmission of the heartbeat signal. In addition, the classroom mode, if implemented, will be terminated, thus activating the network transceiver 166 (see FIG. 2).

As the wireless communication device enters a different classroom (not shown) or re-enters the classroom 220 for a different class, the wireless communication device 120 will automatically, in a manner transparent to the user, establish a wireless communication link with an access point 140 and be automatically authenticated by the classroom server 202. Thus, the authentication process is automatically performed whenever the student wireless communication device enters a classroom. This process can be extended to other areas of the campus where different access points 140 may be installed. As the student wireless communication devices come within range of any access point 140 on the campus, the student wireless communication device establishes a communication link therewith and undergoes the automatic authentication process described above. In this manner, the student may maintain almost continuous contact with the system 100. In turn, the location of the student wireless communication device may also be monitored on a regular basis.

Figure 8:
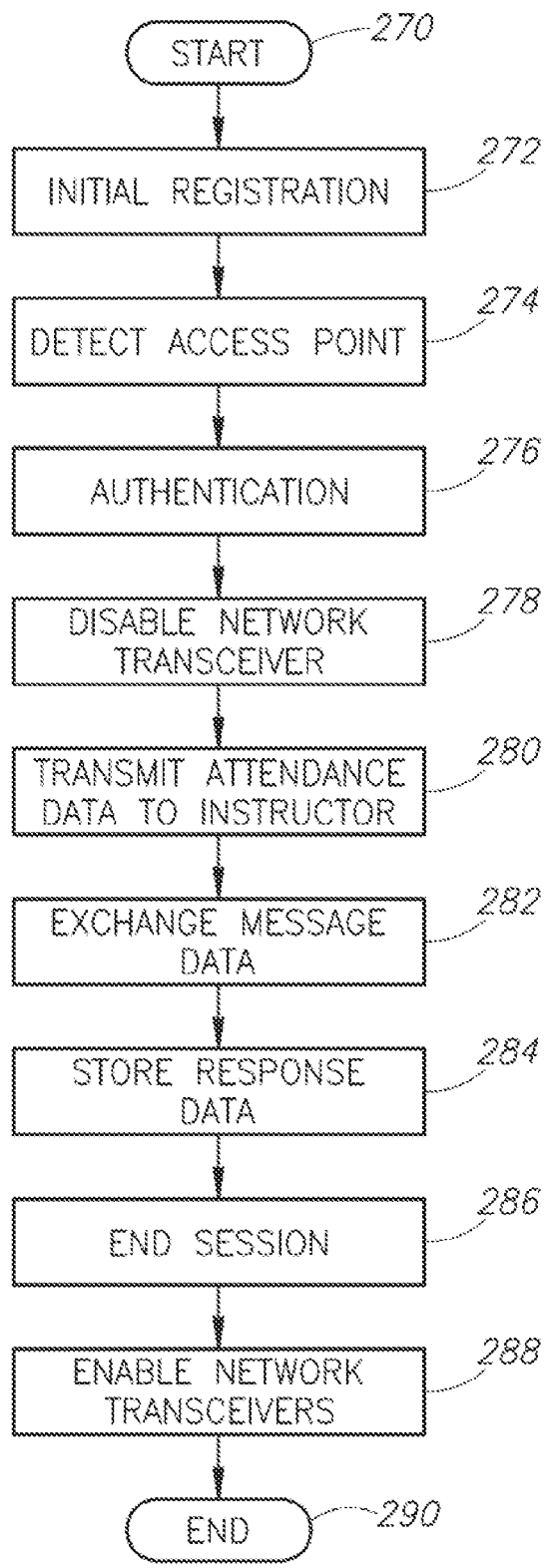
FIG. 8 is a flow chart illustrating the operation of an exemplary embodiment of the present disclosure.

FIG. 8 illustrates a flow chart of an exemplary embodiment of the communication system described herein. At a start 270, the student is presumed to have a wireless communication device having the capabilities described herein. Although typical students will have a smart phone that contains both the network transceiver 166 (see FIG. 2) and the short-range transceiver 176, some students may have a device, such as a computing tablet, that includes WiFi capability (i.e., the short-range transceiver), but no network transceiver 166. The principles of the present invention can be readily applied to such a device. As noted above, one advantage of the system disclosed herein is that it does not rely on the network transceiver 166 or the network infrastructure of the wireless communication network 102 (see FIG. 1). With a WiFi-only computing tablet, there is no network transceiver 166 to disable.

At step 272, the student wireless communication device undergoes an initial registration process. As described above, the student provides information, such as a user name, student email name, or the like. The student also provides a device ID, which may typically include the mobile telephone number as well as the device ID, such as described above. The initial authentication process can occur as described above that requires some interaction between the student and various system components within the education institution. The student registration information is stored in the classroom server 202 (see FIG. 3). Once the student has undergone the original registration and authentication process, the API and the classroom software application program are downloaded to the student wireless communication device. Subsequent authentications occur automatically and in a manner transparent to the user.

In step 274, the student wireless communication device detects an access point 140 (see FIG. 5), such as may occur when the student enters the classroom 220. In step 276, an automatic authentication process occurs. In that automatic authentication process, the student wireless communication device automatically transmits its device ID to the access point 140, which relays that information to the classroom server 202. In an exemplary embodiment, the student wireless communication device can transmit the heartbeat signal to the access point 140 to provide all necessary information for authentication. The classroom server 202 confirms that the device has been registered and can therefore authenticate the device. As noted above, the classroom server may also take the additional step of determining whether the student associated with that wireless communication device is, in fact, registered in the class that is about to begin.

Following authentication, the system can optionally disable the network transceivers 166 (see FIG. 2) in each of the authenticated student wireless devices (i.e., the classroom mode). In step 280, the classroom server 202, which may play a role in the authentication process in step 276, can transmit attendance information to the instructor device 224 (see FIG. 5) to provide the instructor with a list of students present in the classroom 220.

Throughout the class, message data may be exchanged between the instructor device 224 and the student-wireless communication devices (e.g., the wireless communication devices 120-128 in FIG. 5) in the manner described above. For example, the instructor may transmit a query to the student-wireless communication devices via the access points 140 and, in turn, receive response messages from the students. Thus, step 282 may be executed multiple times throughout the class period. In addition, a "study buddy" request may be exchanged as part of step 282.

In step 284, the response data is stored. In one embodiment, the response data may be stored in the instructor device 224. Alternatively, the response data may be received by the instructor device 224 and relayed to the classroom server 202 (see FIG. 3) via the access point 140 and LAN 200.

In step 286, the session ends. This may occur when the class has ended and the instructor device 224 sends a message to access points 140 to temporarily suspend transmissions. This effectively terminates the various wireless communication links between the student-wireless communication devices and the access points 140. Alternatively, the student and the student-wireless communication device may simply exit the classroom 220 and therefore move out of range of the access point 140 thereby terminating the wireless communication link therewith. A loss of communication with the access point 140 causes the student wireless communication devices to disconnect from the system. In addition, the loss of communication with the access point may cause the classroom software application program to automatically terminate. In yet another alternative, the student may manually terminate the classroom software application program, which will cause the student wireless communication device to terminate communication with the access point and disconnect from the system.

Following the end of the session in step 286, the student-wireless communication devices may re-enable the network transceiver 166 in step 288. In one embodiment, the instructor device 224 may send a command to the student-wireless communication devices via the access point 140 instructing it to re-enable the network transceivers prior to the end of the session in step 286. In an alternative embodiment, the student may simply exit the classroom, thus terminating the communication link with the access point 140 within the classroom. In this embodiment, the loss of the communication link with the access point can automatically re-enable the network transceivers 166. In yet another embodiment, the student may manually terminate the classroom software application program. One of the steps in closing the classroom software application program would be to re-enable the network transceiver 166. Those skilled in the art will appreciate that other variations in the sequence of steps in the flow chart of FIG. 8 may also be also satisfactorily applied.

Thus, the communication system takes advantage of the fact that most students already have a smart phone. The system described herein eliminates the need for special communication devices that must be purchased only for use in the classroom. Furthermore, the system disclosed herein does not require access to the Internet for successful operation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
 a plurality of student wireless communication devices, each having:
  a display;
  a user-operable input device;
  a network transceiver configured to communicate with a wireless communication network using frequencies licensed for wide-area networks;
  a short-range non-network transceiver;
  a controller configured to control operation of the non-network transceiver of the first wireless communication device; and
 an instructor wireless communication device having at least the short-range non-network transceiver and the controller configured to control operation of the non-network transceiver of the instructor wireless communication device;
 a wireless access point (AP) configured to transmit the beacon signal wherein the short-range non-network transceiver in each of the plurality of student wireless communication devices is configured to communicate with the instructor wireless communication device via the AP whereby the short-range communication link between the respective short-range non-network transceivers and the instructor wireless communication device is established via the AP;
 wherein the controller in each of the student wireless communication devices is configured to automatically detect the transmitted beacon signal and to establish a short-range communication link between the respective short-range non-network transceivers and the instructor wireless communication device via the AP and to exchange data, including student response data, with the instructor wireless communication device, and upon establishing the short-range communication link, automatically performing an authentication process for each student wireless communication device, and temporarily disabling the respective network transceivers upon authentication during a period of time in which the short-range communication link is established; and wherein the controller in the instructor wireless communication device is configured to receive data from any responding ones of the plurality of student wireless communication devices via the AP.

2. The system of claim 1 wherein the instructor wireless communication device is configured to communicate with the AP via the short-range non-network transceiver in the instructor wireless communication device.

3. The system of claim 1 wherein the short-range non-network transceiver in at least one of the plurality of student wireless communication devices is configured to communicate directly with the instructor wireless communication device via the short-range non-network transceiver in the instructor wireless communication device.

4. The system of claim 1 wherein the authentication process includes automatically transmitting identifying information from each of the plurality of student wireless communication devices, the system further comprising a student identification data structure configured to store data associating a student identification with the identifying information from respective student wireless communication devices to thereby permit identification of students upon establishing the short-range communication link between the respective short-range non-network transceivers and the instructor wireless communication device.

5. The system of claim 4, further comprising a display accessible by an instructor and configured to provide student identification information to the instructor.

6. The system of claim 4 wherein the student identification data structure is further configured to store data associating class registration information in association with the student identification, the system further comprising a display accessible by an instructor and configured to provide student identification and class registration information to the instructor.

7. The system of claim 1 wherein each of the plurality of student wireless communication devices is configured to perform a disconnection process with the instructor wireless communication device at an end of the class session and to enable the respective network transceivers upon disconnection.

8. The system of claim 1 wherein each of the plurality of student wireless communication devices is configured to perform a disconnection process with the instructor wireless communication device upon termination of the short-range communication link between the respective short-range non-network transceivers and the instructor wireless communication device and to enable the respective network transceivers upon disconnection.

9. The system of claim 1, further comprising:
a registration server configured to receive an authentication request from each of each of the plurality of student wireless communication devices via the wireless access point and, in response to each authentication request, to verify an identity of the wireless communication device requesting authentication, and, upon verification of the identity such that the wireless communication device is authenticated, downloading a software program that will configure the controller in each of the student wireless communication devices to automatically establish the short-range communication link between the respective short-range non-network transceivers and the instructor wireless communication device as each of the plurality of student wireless communication devices comes within range of the wireless access point or the short-range non-network transceiver in the instructor wireless communication device.

10. The system of claim 1 wherein the controller in each of the plurality of student wireless communication devices is configured to automatically send a periodic data message to the instructor wireless communication device so long as the short-range communication link between the respective short-range non-network transceivers and the instructor wireless communication device is maintained.

11. The system of claim 10 wherein the periodic data message includes data identifying a student associated with the respective ones of the plurality of student wireless communication devices.

12. The system of claim 1 wherein the controller in each of the plurality of student wireless communication devices is configured to automatically receive a data message from the instructor wireless communication device via the respective short-range communication links, the data message requiring a response, the controller in each of the plurality of student wireless communication devices being responsive to operation of the user-operable input device to enter of a response and further configured to transmit a response message, containing the response, to the instructor wireless communication device via the respective short-range communication links.

13. The system of claim 12 wherein the data message from the instructor wireless communication device includes a plurality of possible responses to the data message requiring the response, the controller in each of the plurality of student wireless communication devices being further configured to automatically display the plurality of possible responses on the respective displays.

14. The system of claim 12 wherein the response message includes data identifying a student associated with the respective ones of the plurality of student wireless communication devices that transmit the response message.

15. The system of claim 14 wherein the response message must be transmitted from the respective ones of the plurality of student wireless communication devices that transmit the response message within a predetermined period of time and, upon expiration of the predetermined period of time, the controller in the instructor wireless communication device indicating that no response message was received from the respective ones of the plurality of student wireless communication devices that did not transmit the response message within the predetermined period of time.

16. The system of claim 12, further comprising a classroom server coupled to the instructor wireless communication device and configured to receive the responses therefrom, the classroom server being configured to associate the responses with student identifications and to store the responses in association with the student identifications.

17. The system of claim 16 wherein the classroom server is further configured to receive correct answer data and to compare the response with the correct answer data to thereby determine correct and incorrect responses associated with student identifications.

18. A method for use with a plurality of student wireless communication devices, each having a network transceiver to establish a network communication link between the respective ones of the plurality of student wireless communication devices and a wireless communication network utilizing a wireless network infrastructure, the method comprising:

transmitting a beacon signal from a wireless access point;

each of the plurality of student wireless communication devices using a short-range non-network transceiver within the respective plurality of student wireless communication devices to detect the transmitted beacon signal;

using a beacon signal to establish a short-range communication link with an instructor wireless communication device via the wireless access point without utilizing the wireless network infrastructure;

performing an authentication process for each of the plurality of student wireless communication devices upon establishing the short-range communication link between the respective ones of the plurality of student wireless communication devices and the instructor wireless communication device to thereby authenticate each of the plurality of student wireless communication devices;

upon authentication, disabling the respective network transceivers during a period of time in which the short-range communication link is established between the respective ones of the plurality of student wireless communication devices and the instructor wireless communication device;

transmitting data, including query data requiring a response, from the instructor wireless communication device to each of the plurality of student wireless communication devices via the wireless access point;

at least a portion of the plurality of student wireless communication devices generating a response message, including a query response; and receiving data, including the query response, transmitted from each of the portion of the plurality of student wireless communication devices generating a response message to the instructor wireless communication device via the wireless access point;

wherein the short-range communication link is established between the instructor wireless communication device and each of the plurality of student wireless communication devices via the wireless access point and without utilizing the wireless network infrastructure.

19. The method of claim 18, further comprising the instructor wireless communication device using a short-range non-network transceiver within the instructor wireless communication device to communicate with the wireless access point via a short-range wireless communication link without utilizing the wireless network infrastructure.

20. The method of claim 18, further comprising the instructor wireless communication device using a short-range non-network transceiver within the instructor wireless communication device to communicate directly with at least a portion of the plurality of student wireless communication devices using the short-range non network transceiver in each of the portion of the plurality of student wireless communication devices without utilizing the wireless network infrastructure.

21. The method of claim 18 wherein the authentication process comprises receiving identifying information from each of the plurality of student wireless communication devices, the method further comprising using the received identifying information from each of the plurality of student wireless communication devices to retrieve data associating a student identification with the identifying information from respective student wireless communication devices to thereby permit identification of students.

22. The method of claim 21, further comprising providing an attendance list to the instructor wireless communication device using the student identification information associated with each of the plurality of student wireless communication devices that have been authenticated.

23. The method of claim 21 wherein the authentication process occurs when each of the plurality of student wireless communication devices enters a classroom for a class, the method further comprising comparing the student identification information associated with each of the plurality of student wireless communication devices with student registration records for the class.

24. The method of claim 23, further comprising declining authentication for one of the plurality of student wireless communication devices when a comparison of the student identification information associated with the one of the plurality of student wireless communication devices with student registration records for the class indicates that a student associated with the one of the plurality of student wireless communication devices is not registered in the class.

25. The method of claim 18, further comprising:

performing a disconnection process with each of the plurality of student wireless communication devices at an end of the class session; and enabling the respective network transceivers upon disconnection.

26. The method of claim 18, further comprising:

performing a disconnection process with each of the plurality of student wireless communication devices upon termination of the short-range communication link between the respective short-range non-network transceivers and the instructor wireless communication device; and enabling the respective network transceivers upon disconnection.

27. The method of claim 18, further comprising automatically send a periodic data message to the instructor wireless communication device so long as the short-range communication link between the respective short-range non-network transceivers and the instructor wireless communication device is maintained.

28. The method of claim 27 wherein the periodic data message includes data identifying a student associated with the respective ones of the plurality of student wireless communication devices.

29. The method of claim 18, further comprising:

sending a data message from the instructor wireless communication device to each of the plurality of student wireless communication devices via the respective short-range communication links, the data message requiring a response; and receiving a response message, containing the response, from at least a portion of the plurality of student wireless communication devices via the respective short-range communication links of the portion of the plurality of student wireless communication devices.

30. The method of claim 29 wherein the data message from the instructor wireless communication device includes a plurality of possible responses to the data message requiring the response.

31. The method of claim 29 wherein the response message includes data identifying a student associated with the respective ones of the portion of the plurality of student wireless communication devices from whom the response message was received.

32. The method of claim 31, further comprising determining which of the plurality of authenticated student wireless communication devices from whom the response message was not received.

33. The method of claim 29, further comprising sending the responses from the instructor wireless communication device to a classroom server, the classroom server associating the responses with student identifications and storing the responses in association with the student identifications.

34. The method of claim 33, further comprising the classroom server receiving correct answer data and comparing the responses with the correct answer data to thereby determine correct and incorrect responses associated with student identifications.

35. The method of claim 29, further comprising:
sending the responses from the instructor wireless communication device to a classroom server for a plurality of different classes;
the classroom server storing the responses for students in the plurality of different classes;
receiving correct answer data and comparing the responses with the correct answer data to thereby determine correct and incorrect responses; and
comparing the correct and incorrect responses of each of the different plurality of classes to thereby determine performance on a class by class basis.

36. The method of claim 29, further comprising:
sending the responses received from a plurality of student wireless communication devices in a plurality of different educational institutions from the instructor wireless communication device in each of the plurality of different educational institutions to a classroom server;
the classroom server storing the responses for students in the plurality of different educational institutions;
receiving correct answer data and comparing the responses with the correct answer data to thereby determine correct and incorrect responses; and
comparing the correct and incorrect responses of each of the different plurality of educational institutions to thereby determine performance on an institution by institution basis.

* * * * *

UNITED STATES PATENT AND TRADEMARK OFFICE
CERTIFICATE OF CORRECTION

PATENT NO. : 9,715,833 B2
APPLICATION NO. : 13/452015
DATED : July 25, 2017
INVENTOR(S) : Gary B. Jabara et al.

It is certified that error appears in the above-identified patent and that said Letters Patent is hereby corrected as shown below:

On the Title Page

Currently reads as:
(73) Assignee: Mobilitie, LLP

Should read as:
(73) Assignee: Mobilitie, LLC

Signed and Sealed this
Third Day of October, 2017

Joseph Matal
*Performing the Functions and Duties of the*
*Under Secretary of Commerce for Intellectual Property and*
*Director of the United States Patent and Trademark Office*